(12) United States Patent
Soeda

(10) Patent No.: US 9,300,832 B2
(45) Date of Patent: Mar. 29, 2016

(54) IMAGE READER AND IMAGE FORMING APPARATUS

(75) Inventor: Yoshihisa Soeda, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 25 days.

(21) Appl. No.: 13/634,640

(22) PCT Filed: Mar. 3, 2011

(86) PCT No.: PCT/JP2011/055566
§ 371 (c)(1),
(2), (4) Date: Sep. 13, 2012

(87) PCT Pub. No.: WO2011/114973
PCT Pub. Date: Sep. 22, 2011

(65) Prior Publication Data
US 2013/0003137 A1 Jan. 3, 2013

(30) Foreign Application Priority Data

Mar. 16, 2010 (JP) ................................. 2010-059554

(51) Int. Cl.
| | | |
|---|---|---|
| *H04N 1/393* | (2006.01) | |
| *H04N 1/04* | (2006.01) | |
| *H04N 1/203* | (2006.01) | |
| *H04N 1/40* | (2006.01) | |
| *H04N 1/12* | (2006.01) | |
| *H04N 1/193* | (2006.01) | |

(52) U.S. Cl.
CPC .......... *H04N 1/0402* (2013.01); *H04N 1/0414* (2013.01); *H04N 1/0443* (2013.01); *H04N 1/203* (2013.01); *H04N 1/2032* (2013.01); *H04N 1/393* (2013.01); *H04N 1/40056* (2013.01); *H04N 1/12* (2013.01); *H04N 1/193* (2013.01)

(58) Field of Classification Search
None
See application file for complete search history.

(56) References Cited

U.S. PATENT DOCUMENTS

| | | | | | |
|---|---|---|---|---|---|
| 3,982,832 | A | * | 9/1976 | Bendall et al. | ............. 430/119.7 |
| 4,634,240 | A | * | 1/1987 | Suzuki et al. | ................. 359/369 |
| 5,963,344 | A | * | 10/1999 | Morita et al. | ................. 358/482 |

(Continued)

FOREIGN PATENT DOCUMENTS

| | | |
|---|---|---|
| CN | 101202807 A | 6/2008 |
| JP | 2002-077596 | 3/2002 |

(Continued)

OTHER PUBLICATIONS

International Search Report issued May 10, 2011 in PCT/JP2011/055566 filed Mar. 3, 2011.

(Continued)

*Primary Examiner* — Vincent Rudolph
*Assistant Examiner* — Michael Burleson
(74) *Attorney, Agent, or Firm* — Oblon, McClelland, Maier & Neustadt, L.L.P.

(57) ABSTRACT

An image reader includes a first image reading unit that reads first image data by scanning one surface of a document at a first resolution corresponding to a magnification ratio and a predetermined first scan cycle; and a second image reading unit that accumulates light radiated from a light source and reads second image data by scanning other surface of the document at a fixed second resolution and a second scan cycle corresponding to the magnification ratio, wherein the second image reading unit controls light accumulation time of the light radiated from the light source to be constant.

18 Claims, 11 Drawing Sheets

(56) References Cited

U.S. PATENT DOCUMENTS

| | | | |
|---|---|---|---|
| 6,032,864 A * | 3/2000 | Hamasuna | 235/462.25 |
| 7,359,099 B2 | 4/2008 | Soeda et al. | |
| 7,433,088 B2 | 10/2008 | Soeda | |
| 7,989,748 B2 | 8/2011 | Soeda | |
| 8,422,086 B2 * | 4/2013 | Baba | 358/474 |
| 2004/0001187 A1 | 1/2004 | Fukusaka | |
| 2005/0270589 A1 | 12/2005 | Soeda | |
| 2007/0127046 A1 | 6/2007 | Soeda | |
| 2008/0013133 A1* | 1/2008 | Taguchi | 358/514 |
| 2009/0015885 A1* | 1/2009 | Kondo | 358/481 |
| 2009/0027745 A1* | 1/2009 | Kweon | 358/498 |

FOREIGN PATENT DOCUMENTS

| | | |
|---|---|---|
| JP | 2002-314801 | 10/2002 |
| JP | 2004-040312 | 2/2004 |
| JP | 2004-187144 | 7/2004 |
| JP | 2005-184560 | 7/2005 |
| JP | 2005-217561 | 8/2005 |
| JP | 3710437 | 8/2005 |
| JP | 2007-074367 | 3/2007 |
| JP | 2008-227989 | 9/2008 |
| JP | 2009-033723 | 2/2009 |

OTHER PUBLICATIONS

Combined Chinese Office Action and Search Report issued Sep. 1, 2014 in Patent Application No. 201180013934.3 with English Translation.

* cited by examiner

IMAGE READER AND IMAGE FORMING APPARATUS

TECHNICAL FIELD

The present invention relates to an image reader and an image forming apparatus.

BACKGROUND ART

In recent years, for the purpose of enhancement of productivity in reading an document, protection of the document, improvement in quietness, and/or the like, image readers having a simultaneous duplex scanning mechanism capable of simultaneously reading both sides of the document have been proposed. In such image forming apparatuses, in general, to read the front side of the document, a charge coupled device (CCD) is used similarly to conventional image forming apparatuses and, to read the back side of the document, a contact image sensor (CIS) is used (for example, see Japanese Patent Application Laid-open No. 2009-33723 and Japanese Patent Application Laid-open No. 2005-217561).

Some CISes have an image processing function within a CIS module. With such CISes, while it is necessary to carry out inter-line correction in the CIS module before image processing, some may assume that the scanning is carried out at a fixed resolution (scan speed) in a sub-scanning direction to cut cost by reducing the memory for the inter-line correction.

With such a fixed resolution, the CIS cannot carry out magnification mechanically by varying the resolution even if the magnification is specified. Accordingly, even when the magnification is specified, the CIS consistently scans the document at the fixed resolution (actual size magnification) regardless of a magnification ratio. An image processing section or a control section at a subsequent stage then magnifies the image data read by the CIS in an electronic magnification process at the magnification ratio specified.

For example, it is assumed that the fixed resolution is 600 dots per inch (dpi) and a magnification of 50% is carried out. In this case, if the resolution is variable, scanning the document at 300 dpi allows the mechanical magnification to be carried out by reading the document in the sub-scanning direction at twice the speed of scanning the document at 600 dpi. However, with the CIS the resolution of which is fixed, it is not possible to carry out the mechanical magnification by scanning the document at 300 dpi and thus, the magnification at 300 dpi needs to be carried out by the electronic magnification process after the document is scanned at 600 dpi.

As described above, while magnification can be carried out by the electronic magnification process even when the resolution is fixed, compared with the mechanical magnification, the reading speed of the document is slowed and thus, the productivity is lowered.

DISCLOSURE OF INVENTION

It is an object of the present invention to at least partially solve the problems in the conventional technology.

According to an aspect of the present invention, there is provided an image reader including: a first image reading unit that reads first image data by scanning one surface of a document at a first resolution corresponding to a magnification ratio and a predetermined first scan cycle; and a second image reading unit that accumulates light radiated from alight source and reads second image data by scanning other surface of the document at a fixed second resolution and a second scan cycle corresponding to the magnification ratio, wherein the second image reading unit controls light accumulation time of the light radiated from the light source to be constant.

BEST MODE(S) FOR CARRYING OUT THE INVENTION

Exemplary embodiments of an image reader and an image forming apparatus according to the present invention will be described in detail with reference to accompanying drawings below. In each of the following embodiments, as an exemplary image forming apparatus, a multifunction peripheral (MFP) having functions of at least one of printing function, copying function, and facsimile function, in addition to scanning function, will be explained. However, it is not limited thereto, and for example, the image forming apparatus may be a copying machine, a scanning device, and the like.

First Embodiment

The structure of an MFP according to a first embodiment will now be described.

Figure 1:
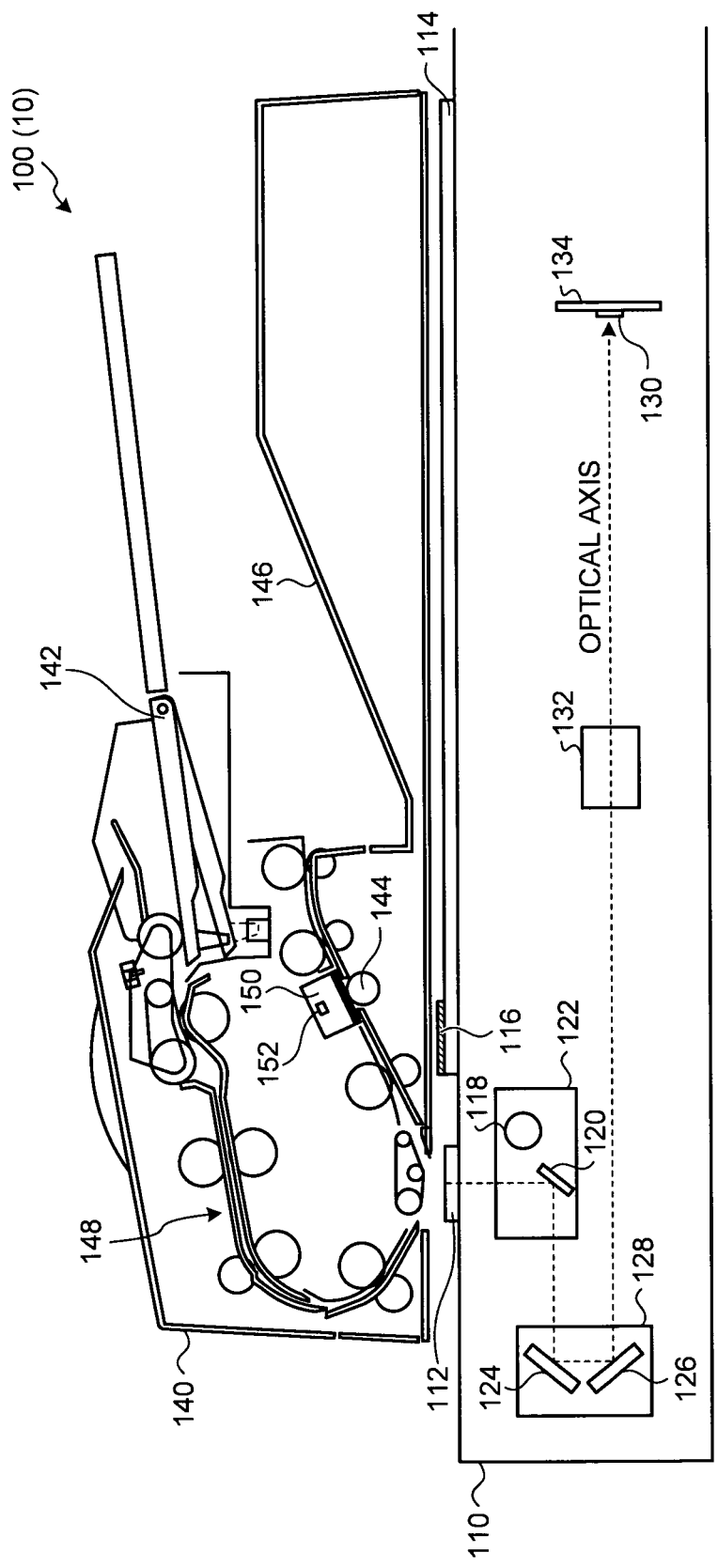
FIG. 1 is a schematic diagram illustrating an exemplary structure of a scanning device according to a first embodiment.

FIG. 1 is a schematic diagram illustrating the exemplary structure of a scanning device 100 (an exemplary image reader) provided to this MFP 10 of the first embodiment. As depicted in FIG. 1, the scanning device 100 is provided with an image reading unit 110 (an exemplary first image reading unit) that reads the front side of an document in its lower portion and an automatic document feeder (ADF) 140 that conveys the document in its upper portion. The ADF 140 includes a contact image sensor (CIS) 150 (an exemplary second image reading unit) that reads the back side of the document.

The image reading unit 110 is provided with a slit glass 112 above which the document fed by the ADF 140 passes over, an exposure glass 114 on which the document to be read is placed, a reference whiteboard 116 for generating shading correction data, a first carriage 122 mounted with a lamp 118 that illuminates the document to be read and a first mirror 120, a second carriage 128 mounted with a second mirror 124 and a third mirror 126, a lens unit 132 that forms a reduced image on a CCD image sensor 130, and a signal processing substrate 134 on which the CCD image sensor 130 is mounted and by which a given process is carried out to an image signal output from the CCD image sensor 130 so as to output the resulting signal to the outside. A lamp 18 can be of any light source and, for example, a light emitting diode (LED) and the like may be used. The image reading unit 110 is also provided with a driving motor that drives the first carriage 122 and the second carriage 128, a home position sensor that detects a home position, an document detecting sensor that detects the document, and the like (all omitted from illustration).

The image reading unit 110 can read the front side of the document by a platen scanning method or a sheet-through scanning method.

The platen scanning method reads the front side of the document placed on the exposure glass 114 by lighting the lamp 18 and by moving and scanning the first carriage 122 and the second carriage 128 in the sub-scanning direction by the driving motor. In the platen scanning method, the image reading unit 110 obtains data of the reference whiteboard 116 prior to reading the document and generates the shading correction data. The image reading unit 110 then carries out shading correction process in parallel with the scanning (read operation) of the document read area.

The sheet-through scanning method reads the front side of the document when the document conveyed by the ADF 140 passes over the slit glass 112 with the lamp 118 lit and the first carriage 122 and the second carriage 128 stopped. In the sheet-through scanning method, the image reading unit 110 moves the first carriage 122 and the second carriage 128 under the reference whiteboard 116 by the driving motor to generate the shading correction data prior to reading the document. The image reading unit 110 moves back the first carriage 122 and the second carriage 128 to the sheet-through read position by the driving motor and then carries out the shading correction process in parallel with the scanning (read operation) of the document conveyed by the ADF 140 in the document read area.

In the sheet-through scanning method, the back side of the document can also be read by using the CIS 150. In other words, in the sheet-through scanning method, while it is possible to read only the front side of the document, it is also possible to read both sides of the document at the same time.

The ADF 140 is provided with an document tray 142 in which the document is placed, a reference white roller 144 provided at a position facing the CIS 150, a discharge tray 146 to which the document is discharged, and a document conveying mechanism 148 (an exemplary conveying unit). The ADF 140 is also provided with a driving motor (not depicted) that drives the document conveying mechanism 148 and the like. When the sheet-through scanning is carried out by the image reading unit 110, the document conveying mechanism 148 conveys the document placed in the document tray 142 over the slit glass 112, through the position where the CIS 150 and the reference white roller 144 face with each other, and then to the discharge tray 146.

The CIS 150 is provided with an LED 152 as a light source and also with a lens array, a sensor element, and the like (all omitted from illustration). When reading both sides of the document at the same time in the sheet-through scanning method, the CIS 150 turns on the LED 152 to illuminate the back side of the document fed by the ADF 140 and passing under the CIS 150, focuses the light reflected from the document onto the sensor element by the lens array, and converts the focused light into image data. As a result, the CIS 150 reads the back side of the document conveyed by the ADF 140. The CIS 150 obtains data of the reference white roller 144 prior to reading the document to generate the shading correction data. The CIS 150 then carries out the shading correction process in parallel with the scanning (read operation) of the document read area.

In the first embodiment, it will be explained that the image reading unit 110 reads the front side of the document while the CIS 150 reads the back side of the document. However, it may be so arranged that the image reading unit 110 reads the back side of the document while the CIS 150 reads the front side of the document. The image reading unit 110 is not required to have all the constituents described above as essential constituents, and may be structured with some of the constituents omitted.

Figure 2:
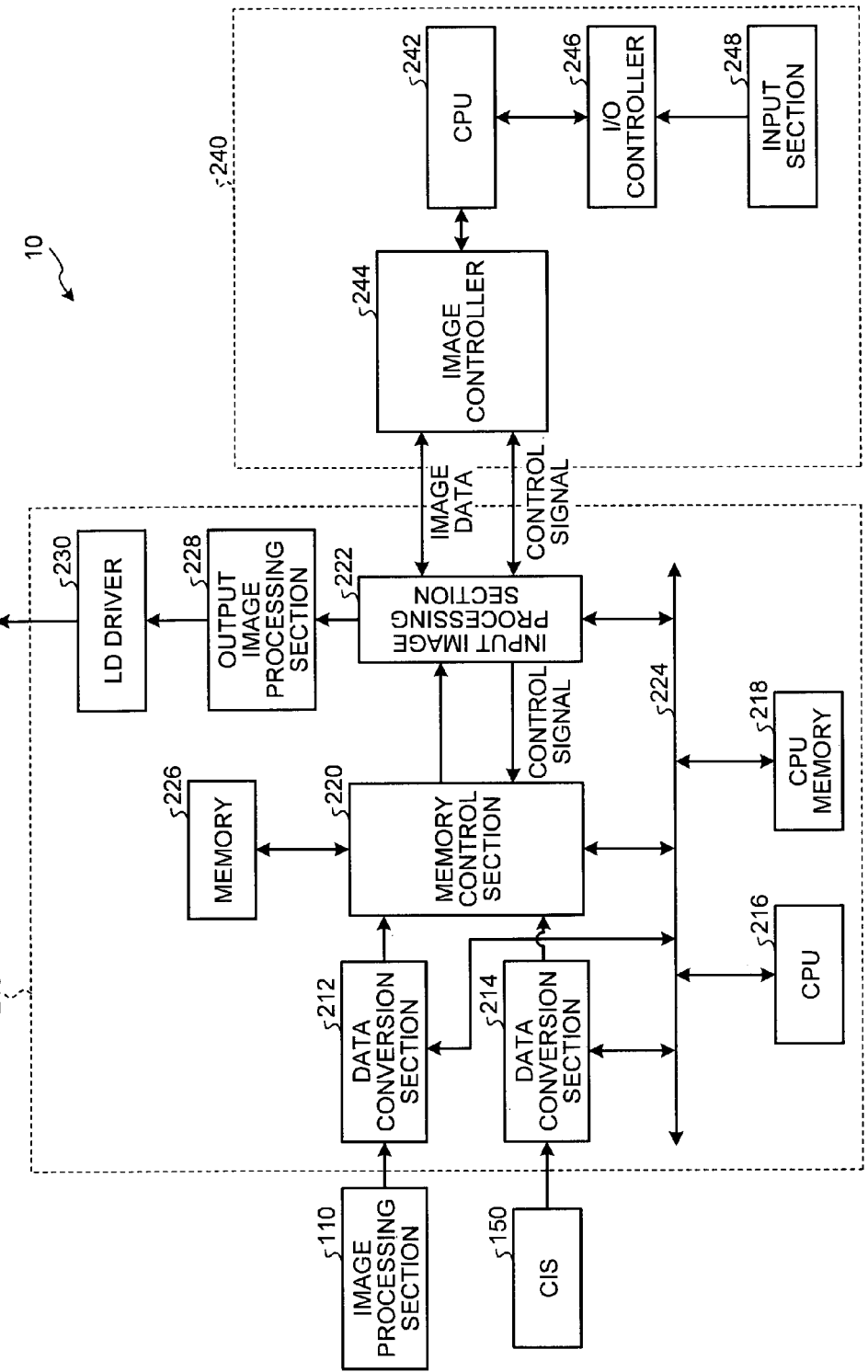
FIG. 2 is a block diagram illustrating an exemplary hardware structure of an MFP of the first embodiment.

FIG. 2 is a block diagram illustrating an exemplary hardware structure of the MFP 10 of the first embodiment. As depicted in FIG. 2, the MFP 10 is provided with the image reading unit 110, the CIS 150, an image processing section 210, and a controller 240.

The image processing section 210 is provided with a data conversion section 212, a data conversion section 214, a central processing unit (CPU) 216, a CPU memory 218, a memory control section 220, an input image processing section 222 (an exemplary magnifying unit), and a bus 224 with which all these sections are connected. The image processing section 210 is also provided with a memory 226 connected with the memory control section 220, an output image processing section 228 connected with the input image processing section 222, and a laser diode (LD) driver 230 connected with the output image processing section 228. In the structure depicted in FIG. 2, for example, the image reading unit 110, the CIS 150, and the image processing section 210 (excluding the output image processing section 228 and the LD driver 230) collectively correspond to the scanning device 100.

The image reading unit 110 reads image data on the front side of the document, and transfers the image data thus read through the data conversion section 212 and the memory control section 220 and then to the input image processing section 222. More specifically, the signal processing substrate 134 carries out a given process such as an analog-to-digital (A/D) conversion process, a signal amplification process, and a shading process to the image data (image signal) output from the CCD image sensor 130 and then transfers the resulting data to the input image processing section 222.

The image reading unit 110 here is assumed to have variable resolution. Accordingly, the CPU 216 controls the driving motor so that the document conveying mechanism 148 conveys the document at a conveying speed corresponding to the magnification ratio, and the image reading unit 110 reads the image data by scanning the front side of the document at a resolution changed corresponding to the magnification ratio, whereby the magnification can be carried out mechanically. For example, when a magnification of 50% is specified, the CPU 216 makes the document conveying mechanism 148 conveys the document at twice the conveying speed of the reading at the actual size magnification, while the image reading unit 110 reads the image data by scanning the front side of the document at one-half the resolution for reading at actual size magnification, whereby the magnification of 50% can be carried out mechanically.

The CIS 150 reads the image data on the back side of the document and transfers the image data thus read through the data conversion section 214 and the memory control section 220 and then to the input image processing section 222. More specifically, the CIS 150 carries out a given process such as the A/D conversion process, the signal amplification process, and the shading process to the image data thus read (image signal) and then transfers the data to the input image processing section 222.

The CIS 150 here is assumed to carry out inter-line correction before carrying out the image processing described above, and is designed to scan at a fixed resolution (scan speed) in the sub-scanning direction to cut cost by reducing the memory for the inter-line correction. Therefore, when reading both sides of the document in the sheet-through scanning method, the CIS 150 always reads the image data on the back side of the document at a fixed resolution (actual size magnification). Even with such scanning method, the magnification (reduction) can be carried out electronically. However, compared with the mechanical magnification, the reading speed of the document is slower and thus, the productivity is lowered.

In the first embodiment, the CPU 216, by controlling the driving motor, makes the document conveying mechanism 148 to convey the document at a conveying speed corresponding to the magnification ratio, the CIS 150 reads image data by scanning the back side of the document at a line scanning cycle changed corresponding to the magnification ratio, and the input image processing section 222 carries out the magnification of the image data thus read electronically. For example, when a magnification of 50% is specified, the CPU 216 makes the document conveying mechanism 148 conveys the document at twice the conveying speed of the reading at the actual size magnification, the CIS 150 reads the image data on the back side of the document by scanning at one-half the line scanning cycle of the reading at the actual size magnification, and the input image processing section 222 carries out the magnification of the image data thus read to 50% electronically. This makes it possible, even when the resolution is fixed and the magnification is carried out electronically, to prevent the decrease in the reading speed of the document and thus to prevent the reduction in the productivity, thereby maintaining the productivity similar to that of the mechanical magnification.

However, if the line scanning cycle corresponding to the magnification ratio (reduction ratio) is merely shortened, a light accumulation time of the light radiated from the LED 152 is also shortened. As a result, scanning characteristics such as deterioration of S/N is changed, thereby resulting in deterioration (fluctuation) of image quality.

In the first embodiment, therefore, the CIS 150 controls the light accumulation time to be less than or equal to a lower limit of the line scanning cycle (constant). More specifically, the CIS 150 controls the lighting of the LED 152 to control the light accumulation time to be less than or equal to the lower limit of the line scanning cycle. Consequently, even when the line scanning cycle is changed corresponding to the magnification ratio, the light accumulation time can be held constant and thus, fluctuation in scanning characteristics and the deterioration of the image quality can be avoided.

The data conversion section 212 converts a format of the image data received from the image reading unit 110 to the format suitable for the input image processing section 222. The data conversion section 214 converts a format of the image data received from the CIS 150 to the format suitable for the input image processing section 222.

The memory control section 220 once writes the image data received from the data conversion section 212 and the data conversion section 214 to the memory 226 and then, reads the image data thus written from the memory 226 and transfers the data to the input image processing section 222.

The input image processing section 222 carries out image processing, such as γ-correction and modulation transfer function (MTF) correction that are attributable to the input characteristics, and a magnification process to the image data transferred from the memory control section 220 and then, transfers the data to the controller 240. The input image processing section 222 also outputs the image data transferred from the controller 240 to the output image processing section 228.

The output image processing section 228 carries out image processing such as a filtering process and a color space conversion process that conform to the output characteristics to the image data received from the input image processing section 222 and then, outputs the resulting data to the LD driver 230.

The LD driver 230 drives the LD corresponding to the image data received from the output image processing section 228 and irradiates a photosensitive element in an image forming section not depicted with a laser beam. On the photosensitive element, an electrostatic latent image is formed, transferred, fixed, and is then output as a printed image.

The CPU 216 controls, using the CPU memory 218 as a work area, the respective sections of the image processing section 210, the image reading unit 110, the CIS 150, and the ADF 140. The CPU 216 also communicates with a CPU 242 in the controller 240 to send and receive various data. The magnification process carried out by the input image processing section 222 in hardware may be carried out in software by the CPU 216.

The controller 240 is provided with the CPU 242, an image controller 244 connected with the CPU 242, an I/O controller 246 connected with the CPU 242, and an input section 248 connected with the I/O controller 246.

The image controller 244 stores the image data transferred from the input image processing section 222 in a hard disk drive (HDD) and the like not depicted. The image controller 244 reads the image data stored in the HDD and transfers the data to the image processing section 210.

The input section 248 (an exemplary mode input unit) makes various inputs such as inputting an instruction to start reading the document and inputting a scanning mode.

The CPU 242 controls various sections of the controller 240. The CPU 242 also communicates with the CPU 216 in the image processing section 210 to send and receive various data such as the input data from the input section 248 via the I/O controller 246.

The operation carried out in the MFP according to the first embodiment will now be described.

Figure 3:
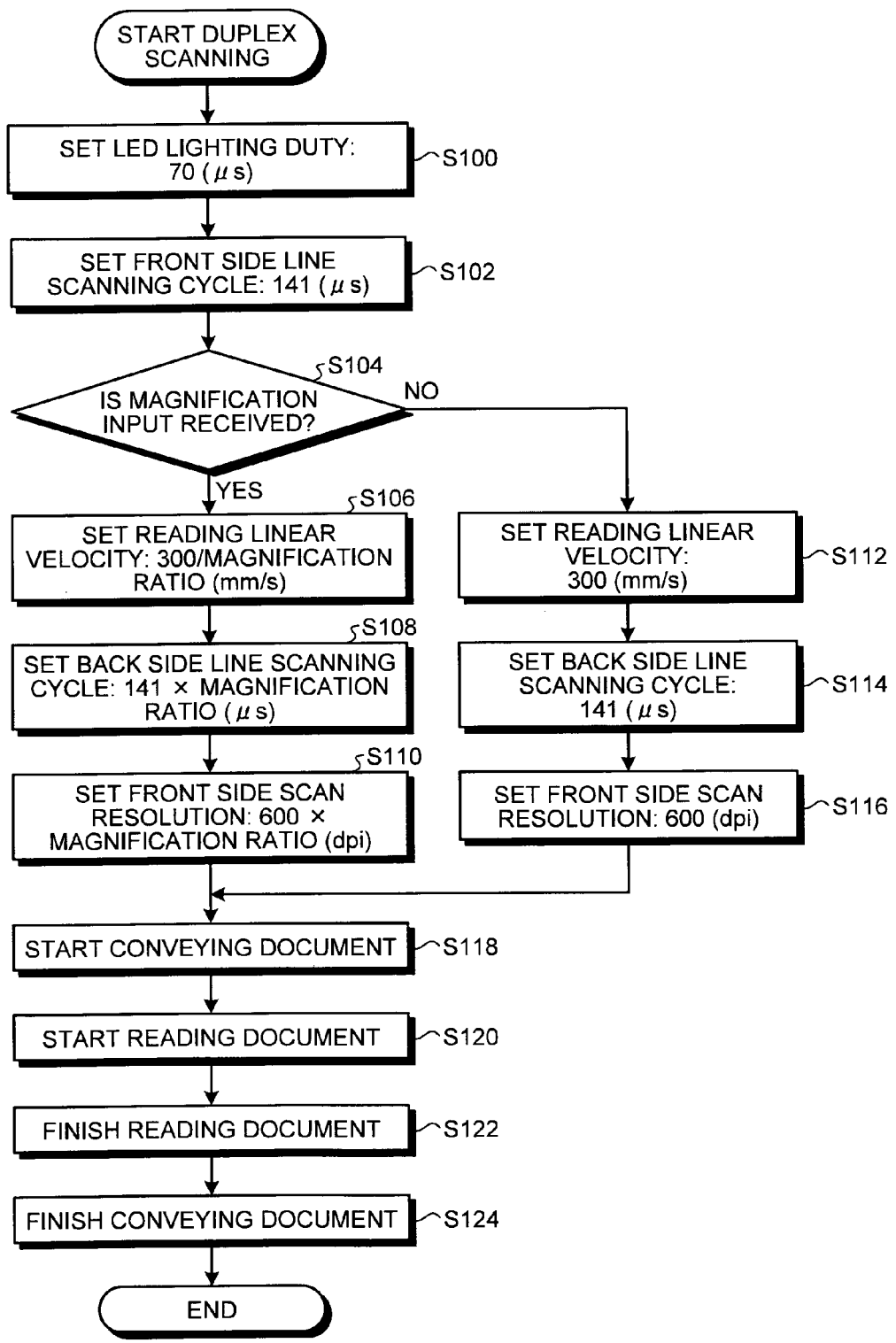
FIG. 3 is a flowchart illustrating an example of a duplex scanning process carried out by the MFP of the first embodiment.

FIG. 3 is a flowchart illustrating an exemplary procedure of a duplex scanning process carried out in the MFP 10 of the first embodiment. In the example illustrated in FIG. 3, it is assumed that while the document is placed in the document tray 142 of the ADF 140 and a duplex scanning mode is set by the input image processing section 222 based on the input from the input section 248, the input of start reading is received from the input section 248. In FIG. 3, while it is exemplified that the range of mechanical magnification is from 50% to 100% (300 dpi to 600 dpi) and, when the scanning device 100 reads at actual size magnification, the reading linear velocity is 300 mm/s, the front side line scanning cycle is 141 microseconds, the front side scan resolution is 600 dpi, the back side line scanning cycle is 141 microseconds, and the back side scan resolution is 600 dpi, it is not limited as such.

When the CPU 216 receives the input of start reading from the input section 248 via the CPU 242, the CPU 216 sets lighting duty of the LED 152 less than or equal to the lower limit of the back side line scanning cycle. While it will be described in detail later, in the example depicted in FIG. 3, because the lower limit of the back side line scanning cycle is 70.5 (141×1/2) microseconds, the CPU 216 sets the lighting duty of the LED 152 to 70 microseconds (Step S100).

The CPU 216 then sets the front side line scanning cycle (an exemplary first scan cycle) to 141 microseconds (Step S102).

If the magnification input that inputs the magnification ratio is received from the input section 248 before the input of start reading (Yes at Step S104), the CPU 216 sets the reading linear velocity (an exemplary conveying speed) corresponding to the magnification ratio received from the input section 248 via the CPU 242. More specifically, the CPU 216 sets the reading linear velocity to a speed obtained from dividing 300 mm/s that is the reading linear velocity of when the reading is performed at actual size magnification by the magnification ratio (Step S106). For example, if the magnification ratio is 1/2 (50%), the CPU 216 sets the reading linear velocity to 600 (300/(1/2)) mm/s. In the example depicted in FIG. 3, because the range of magnification is from 50% to 100%, the reading linear velocity is set in the range between 300 mm/s and 600 mm/s.

The CPU 216 sets the back side line scanning cycle (an exemplary second scan cycle) corresponding to the magnification ratio received from the input section 248 via the CPU 242. More specifically, the CPU 216 sets the back side line scanning cycle to a cycle obtained from multiplying 141 microseconds that is the back side line scanning cycle of when the reading is performed at the actual size magnification by the magnification ratio (Step S108). For example, when the magnification ratio is 1/2 (50%), the CPU 216 sets the back side line scanning cycle to 70.5 (141×1/2) microseconds. In the example depicted in FIG. 3, because the range of magnification is between 50% and 100%, the back side line scanning cycle is set in the range between 70.5 microseconds and 141 microseconds. Here, the lower limit of the back side line scanning cycle is 70.5 microseconds.

The CPU 216 sets the front side scan resolution (an exemplary first resolution) corresponding to the magnification ratio received from the input section 248 via the CPU 242. More specifically, the CPU 216 sets the front side scan resolution to a resolution obtained from multiplying 600 dpi that is the front side scan resolution of when the reading is performed at the actual size magnification by the magnification ratio (Step S110). For example, when the magnification ratio is 1/2 (50%), the CPU 216 sets the front side scan resolution to 300 (600×1/2) dpi. In the example depicted in FIG. 3, because the range of magnification is between 50% and 100%, the front side resolution is set in the range between 300 dpi and 600 dpi. The back side scan resolution (an exemplary second resolution), however, is fixed at 600 dpi.

Meanwhile, when the magnification input that inputs the magnification ratio is not received from the input section 248 before the input of start reading (No at Step S104), the CPU 216 sets the reading linear velocity to 300 mm/s that is the reading linear velocity of when the reading is performed at the actual size magnification (Step S112).

The CPU 216 sets the back side line scanning cycle to 141 microseconds that is the back side line scanning cycle of when the reading is performed at actual size magnification (Step S114).

The CPU 216 then sets the front side scan resolution to 600 dpi that is the front side scan resolution of when the reading is performed at the actual size magnification (Step S116). The back side scan resolution, however, is fixed at 600 dpi.

When setting of various parameters is finished and the CPU 216 starts to control the driving motor, the document conveying mechanism 148 starts to convey the document at the reading linear velocity set by the CPU 216 (Step S118).

The image reading unit 110 reads the image data of the front side of the document fed by the document conveying mechanism 148 according to the front side line scanning cycle, the front side scan resolution, and the like set by the CPU 216, and the CIS 150 reads the image data of the back side of the document conveyed by the document conveying mechanism 148 according to the lighting duty, the back side line scanning cycle, and the like set by the CPU 216 (Step S120).

Figure 4:
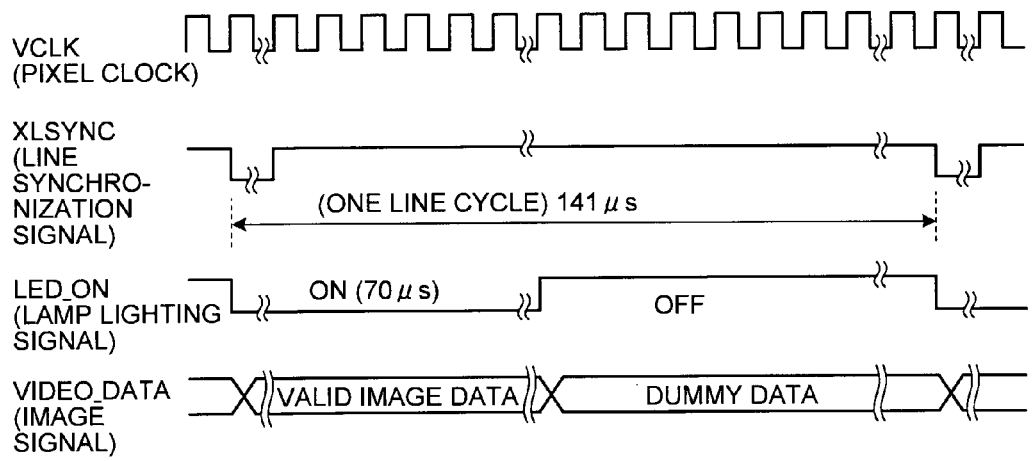
FIG. 4 is a timing chart illustrating exemplary signals communicated between an input image processing section and a CIS of the first embodiment when reading is performed at actual size magnification.

FIG. 4 is a timing chart illustrating exemplary signals communicated between the input image processing section 222 and the CIS 150 when reading is performed at actual size magnification.

In the example depicted in FIG. 4, every 141 microseconds that is the back side line scanning cycle, a line synchronization signal is generated by the CIS 150 and is input to the input image processing section 222. Synchronized with the line synchronization signal, the CIS 150 starts to generate a lamp lighting signal that indicates the lighting of the LED 152 and, for a duration of 70 microseconds set by the lighting duty, the lamp lighting signal is kept input to the input image processing section 222. The image signal from the CIS 150 is input to the input image processing section 222 within the back side line scanning cycle.

In other words, in the example depicted in FIG. 4, the CIS 150 starts to read the image data of one line on the back side of the document every 141 microseconds, and turns on the LED 152 for the period of 70 microseconds. The CIS 150 then reads the image data for the one line on the back side of the document and outputs the data to the input image processing section 222 within the period of 141 microseconds.

Figure 5:
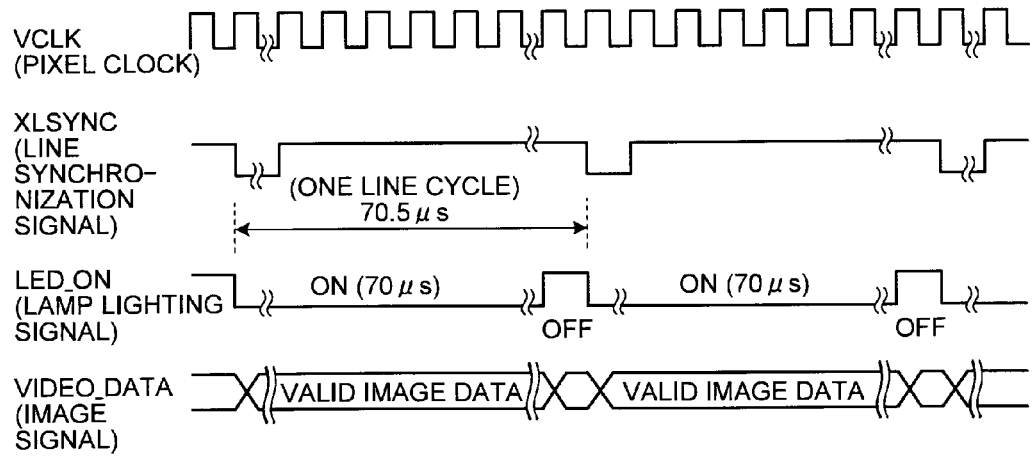
FIG. 5 is a timing chart illustrating exemplary signals communicated between the input image processing section and the CIS of the first embodiment when reading is performed at a magnification ratio of one-half.

FIG. 5 is a timing chart illustrating exemplary signals communicated between the input image processing section 222 and the CIS 150 when reading in magnification at a magnification ratio of one-half.

In the example illustrated in FIG. 5, every 70.5 microseconds that is a back side line scanning cycle, a line synchronization signal is generated by the CIS 150 and is input to the input image processing section 222. Synchronized with the line synchronization signal, the CIS 150 starts to generate a lamp lighting signal indicating the lighting of the LED 152 and, for the duration of 70 microseconds set by the lighting duty, the lamp lighting signal is kept input to the input image processing section 222. The image signal from the CIS 150 is input to the input image processing section 222 within the back side line scanning cycle. The pixel clock frequency is set at a frequency that allows valid image data to be transferred even when the back side line scanning cycle is changed corresponding to the magnification ratio. This makes it possible to change the back side line scanning cycle corresponding to the magnification ratio.

In other words, in the example depicted in FIG. 5, the CIS 150 starts to read the image data of one line on the back side of the document every 70.5 microseconds and turns on the LED 152 for the period of 70 microseconds. The CIS 150 then reads the image data for the one line on the back side of the document and outputs the data to the input image processing section 222 within the period of 70.5 microseconds.

In the example depicted in FIG. 5, while the image data for one line on, the front side of the document read by the image reading unit 110 is magnified at 50% (300 dpi) in the sub-scanning direction mechanically, the image data of one line on the back side of the document read by the CIS 150 is not magnified. Therefore, the input image processing section 222 carries out the magnification of 50% (300 dpi) in the sub-scanning direction, electronically.

The image reading unit 110 finishes reading when the image data for the entire lines of the front side of the document is read, and the CIS 150 finishes reading when the image data for the entire lines of the back side of the document is read (Step S122).

The CPU 216 then finishes the control of the driving motor and thus, the document conveying mechanism 148 finishes conveying the document (Step S124).

In the first embodiment, even when the resolution is fixed, magnification is made electronically by making the reading linear velocity faster corresponding to the reduction ratio and by shortening the line scanning cycle corresponding to the reduction ratio. This makes it possible to prevent decrease in the reading speed of the document and to prevent lowering in the productivity, thereby maintaining the productivity similar to that of the mechanical magnification.

In the first embodiment, because the lighting duty of the LED 152 is controlled to be less than or equal to the lower limit of the line scanning cycle, the light accumulation time can be held constant even when the line scanning cycle is changed corresponding to the magnification ratio, thereby making it possible to prevent the scanning characteristics from fluctuating and to prevent the image quality from deteriorating. The lighting duty of the LED 152 is assumed to be designed as an illumination system that has luminance required to satisfy the scanning performance (S/N) of the scanning device 100.

First Modification

The first embodiment describes an example of magnifying the front side of the document mechanically and magnifying the back side of the document electronically. In a first modification, an example of selecting the magnification described in the foregoing or the magnification of both sides of the document being magnified electronically depending on whether the priority is given to the productivity of the image data or to the reusability of the image data will be explained. In the following, the difference from the first embodiment will mainly be explained, while the explanations for the constituents having the same functions as those of the first embodiment are omitted.

Figure 6:
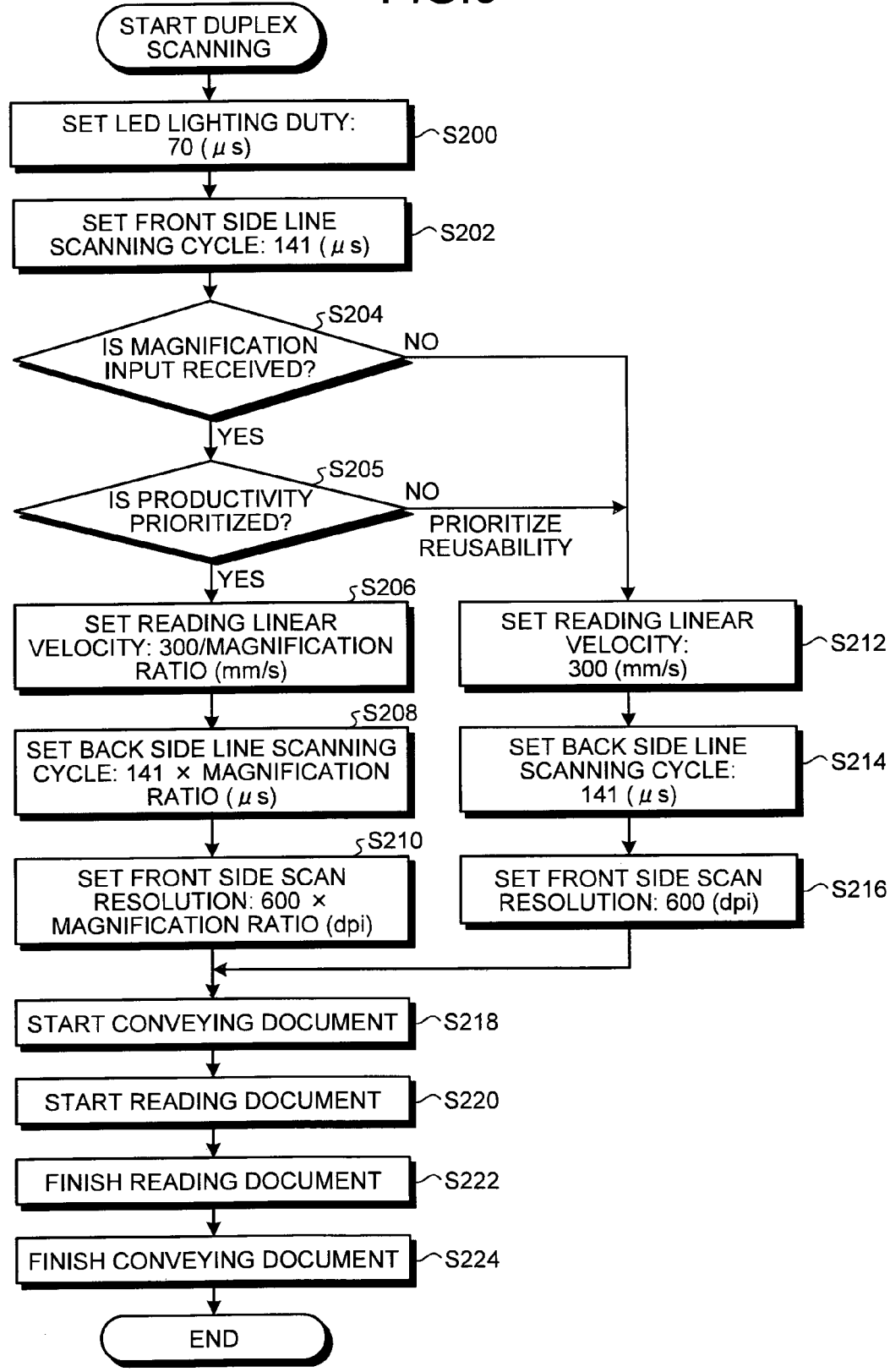
FIG. 6 is a flowchart illustrating an example of a duplex scanning process carried out by an MFP according to a first modification.

FIG. 6 is a flowchart illustrating an exemplary procedure of the duplex scanning process carried out in the MFP 10 of the first modification.

The processes carried out at Steps S200 to S204 are the same as those carried out at Steps S100 to S104, respectively, of the flowchart indicated in FIG. 3 and thus, their explanations are omitted.

At Step S205, when the input of productivity mode that prioritizes the productivity of the image data is received from the input section 248 before the input of start reading (Yes at Step S205), the procedure proceeds to Step S206 and, when the input of reusability mode that prioritizes the reusability of the image data is received (No at Step S205), the procedure proceeds to Step S212.

The processes carried out at Steps S206 to S210 and Steps S218 to S224 when the input of productivity mode is received are the same as those of Steps S106 to S110 and Steps S118 to S124, respectively, of the flowchart indicated in FIG. 3 and thus, their explanations are omitted.

The processes carried out at Steps S212 to S218 and Steps S222 to S224 when the input of reusability mode is received are the same as those of Steps S112 to S118 and Steps S122 to S124, respectively, of the flowchart indicated in FIG. 3 and thus, their explanations are omitted.

At Step S220, when the input of reusability mode is received, the input image processing section 222 transfers the image data of the front side of the document read by the image reading unit 110 and the image data of the back side of the document read by the CIS 150 to the image controller 244 to have the data stored in the HDD and the like. The input image processing section 222 then receives the image data of the front side and the back side stored in the HDD and the like transferred from the image controller 244 and carries out the magnification electronically.

In other words, in the reusability mode, even when the magnification is carried out, both the front and back sides of the document are read at actual size magnification and, after the image data read at actual size magnification is stored, the magnification of a specified magnification ratio is carried out electronically by the input image processing section 222.

In the reusability mode, because the image data read at actual size magnification is stored even when the magnification is carried out, the stored image data can be magnified at a magnification ratio different from the magnification ratio specified at the time of reading and thus, can be output as a copied image or transmitted via a facsimile, whereby the reusability of the image data can be enhanced.

Second Modification

The first embodiment describes an example of magnifying the front side of the document mechanically and magnifying the back side of the document electronically. In a second modification, an example of selecting the magnification described in the foregoing or the magnification of both sides of the document being magnified electronically depending on whether it is in a scanning application mode in which reading is carried out by a scanning application or in a copying application mode in which reading is carried out by a copying application will be explained. In the following, the difference from the first embodiment will mainly be explained and thus, the explanations of the constituents having the same functions as those of the first embodiment are omitted.

Figure 7:
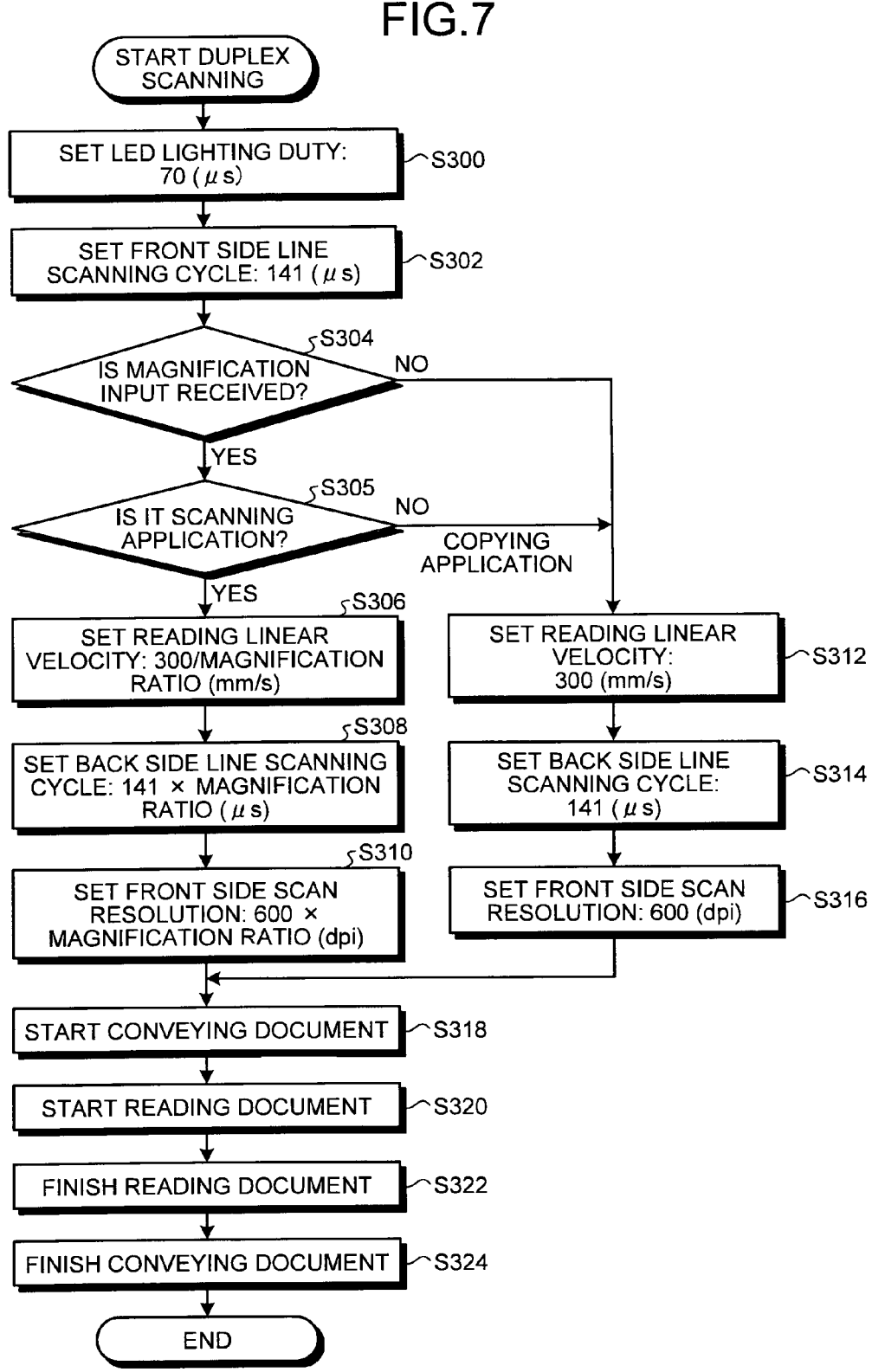
FIG. 7 is a flowchart illustrating an example of a duplex scanning process carried out by an MFP according to a second modification.

FIG. 7 is a flowchart illustrating an exemplary procedure of the duplex scanning process carried out in the MFP 10 of the second modification.

The processes carried out at Steps S300 to S304 are the same as those carried out at Steps S100 to S104, respectively, of the flowchart indicated in FIG. 3 and thus, their explanations are omitted.

At Step S305, when the input of scanning application mode is received from the input section 248 before the input of start reading (Yes at Step S305), the procedure proceeds to Step S306 and, when the input of copying application mode is received (No at Step S305), the procedure proceeds to Step S312.

The processes carried out at Steps S306 to S310 and Steps S318 to S324 when the input of scanning application mode is received are the same as those of Steps S106 to S110 and Steps S118 to S124, respectively, of the flowchart indicated in FIG. 3 and thus, their explanations are omitted.

The processes carried out at Steps S312 to S318 and Steps S322 to S324 when the input of copying application mode is received are the same as those of Steps S112 to S118 and Steps S122 to S124, respectively, of the flowchart indicated in FIG. 3 and thus, their explanations are omitted.

At Step S320, when the input of copying application mode is received, the input image processing section 222 transfers the image data of the front side of the document read by the image reading unit 110 and the image data of the back side of the document read by the CIS 150 to the image controller 244 to have the data stored in the HDD and the like. The input image processing section 222 then receives the image data of the front side and the back side stored in the HDD and the like transferred from the image controller 244, carries out the magnification electronically, and outputs the resulting data to the output image processing section 228 to be output as a copied image.

In other words, in the copying application mode, even when the magnification is carried out, the front side and the back side of the document are read at actual size magnification and, after the image data read at actual size magnification is stored, the magnification of a specified magnification ratio is carried out electronically by the input image processing section 222 to output the resulting data as a copied image.

Consequently, in the scanning application mode, the productivity of the image data can be prioritized and, in the copying application mode, the reusability of the image data can be prioritized. In the second modification, while it is exemplified that the productivity of the image data is prioritized in the scanning application mode and the reusability of the image data is prioritized in the copying application mode, the relation of each application mode and what is prioritized is not limited as such. For example, the reusability of the image data may be prioritized in the scanning application mode and the productivity of the image data may be prioritized in the copying application mode, or it may be configured to input from the input section 248 whether the reusability is prioritized or the productivity is prioritized for each application mode.

Third Modification

The first embodiment describes an example of magnifying the front side of the document mechanically and magnifying the back side of the document electronically. In a third modification, an example of mechanically magnifying the front side of the document in single-side scanning and, in duplex scanning, electronically magnifying both sides of the document or mechanically and electronically magnifying the front side of the document and electronically magnifying the back side of the document will be explained. In the following, the difference from the first embodiment will mainly be explained, and the explanations of the constituents having the same functions as those of the first embodiment are omitted.

Figure 8:
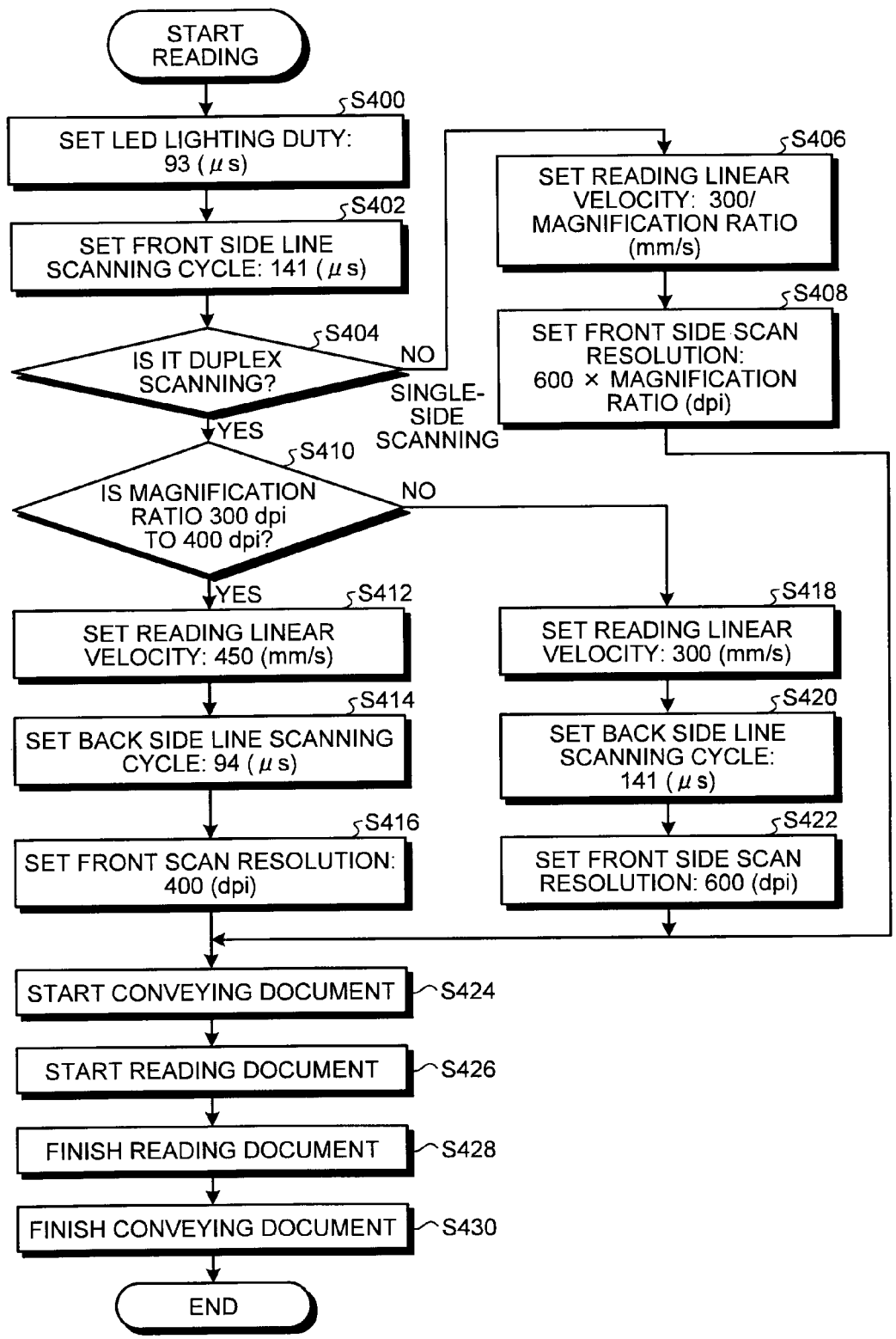
FIG. 8 is a flowchart illustrating an example of a scanning process carried out by an MFP according to a third modification.

FIG. 8 is a flowchart illustrating an exemplary procedure of the reading process carried out in the MFP 10 of the third modification. In the example illustrated in FIG. 8, it is assumed that while the document is placed in the document tray 142 of the ADF 140 and the input of magnification that inputs the magnification ratio is received from the input section 248, the input of start reading is received from the input section 248. In FIG. 8, it is assumed that the range of mechanical magnification is between 400 dpi and 600 dpi, and the magnification of the front side of the document between 300 dpi and 400 dpi is carried out by combining the mechanical magnification and electronic magnification.

When the CPU 216 receives the input of start reading from the input section 248 via the CPU 242, the CPU 216 sets the lighting duty of the LED 152 to less than or equal to the lower limit of the back side line scanning cycle. While it will be described in detail later, in the example depicted in FIG. 8, because the lower limit of the back side line scanning cycle is 94 (141×2/3) microseconds, the CPU 216 sets the lighting duty of the LED 152 to 93 microseconds (Step S400).

The CPU 216 then sets the front side line scanning cycle to 141 microseconds (Step S402).

If the input of single-side scanning mode is received from the input section 248 before the input of start reading (No at Step S404), the CPU 216 sets the reading linear velocity corresponding to the magnification ratio received from the input section 248 via the CPU 242. More specifically, the CPU 216 sets the reading linear velocity to a speed obtained from dividing 300 mm/s that is the reading linear velocity when reading is performed at actual size magnification by the magnification ratio (Step S406).

The CPU 216 then sets the front side scan resolution corresponding to the magnification ratio received from the input section 248 via the CPU 242. More specifically, the CPU 216 sets the front side scan resolution to a resolution obtained from multiplying 600 dpi that is the front side scan resolution when the reading is performed at actual size magnification by the magnification ratio (Step S408).

Meanwhile, when the input of duplex scanning mode is received from the input section 248 before the input of start reading (Yes at Step S404) and the range of magnification indicated by the magnification ratio received by the CPU 216 is within the range between 300 dpi and 400 dpi (Yes at Step S410), the CPU 216 sets the reading linear velocity to 450 (300/(2/3)) mm/s (Step S412).

The CPU 216 sets the back side line scanning cycle to 94 (141×2/3) microseconds (Step S414). In the example depicted in FIG. 8, because the range of mechanical magnification is between 400 dpi and 600 dpi, the back side line scanning cycle ranges from 94 microseconds to 141 microseconds and thus the lower limit of the back side line scanning cycle is 94 microseconds.

The CPU 216 then sets the front side scan resolution to 400 (600×2/3) dpi (Step S416). The back side scan resolution, however, is fixed at 600 dpi.

When the input of duplex scanning mode is received from the input section 248 before the input of start reading (Yes at Step S404) and the range of magnification indicated by the magnification ratio received by the CPU 216 is outside the range of 300 dpi to 400 dpi (No at Step S410), the CPU 216 sets the reading linear velocity to 300 mm/s that is the reading linear velocity of the reading at actual size magnification (Step S418).

The CPU 216 sets the back side line scanning cycle to 141 microseconds that is the back side line scanning cycle of when the reading is performed at actual size magnification (Step S420).

The CPU 216 sets the front side scan resolution to 600 dpi that is the front side scan resolution of when reading is performed at actual size magnification (Step S422). The back side scan resolution is fixed at 600 dpi.

When setting of various parameters is finished and the CPU 216 starts to control the driving motor, the document conveying mechanism 148 starts to convey the document at the reading linear velocity set by the CPU 216 (Step S424).

At Step S426, when the input of single-side scanning mode is received (No at Step S404), the image reading unit 110 reads the image data of the front side of the document conveyed by the document conveying mechanism 148 according to the front side line scanning cycle, the front side scan resolution, and the like set by the CPU 216. In this case, the image data of the front side of the document read by the image reading unit 110 is magnified mechanically in the sub-scanning direction at the magnification ratio specified.

At Step S426, when the input of duplex scanning mode is received and the range of magnification is within the range of 300 dpi to 400 dpi (Yes at Step S410), the image reading unit 110 reads the image data of the front side of the document conveyed by the document conveying mechanism 148 according to the front side line scanning cycle, the front side scan resolution, and the like set by the CPU 216. Furthermore, the CIS 150 reads the image data of the back side of the document conveyed by the document conveying mechanism 148 according to the lighting duty, the back side line scanning cycle, and the like set by the CPU 216.

In this case, the image data of the front side of the document read by the image reading unit 110 is mechanically magnified in the sub-scanning direction at 400 dpi, while the image data of the back side of the document read by the CIS 150 is not magnified. Accordingly, when the image data magnified at 400 dpi is transferred from the image reading unit 110, the input image processing section 222 carries out the further magnification electronically in the sub-scanning direction such that the magnification ratio specified is obtained. Similarly, when the image data of the back side of the document is transferred from the CIS 150, the input image processing section 222 carries out the magnification electronically in the sub-scanning direction at the magnification ratio specified.

At Step S426, when the input of duplex scanning mode is received and the range of magnification is outside the range of 300 dpi to 400 dpi (No at Step S410), the image reading unit 110 reads the image data of the front side of the document conveyed by the document conveying mechanism 148 according to the front side line scanning cycle, the front side scan resolution, and the like set by the CPU 216. The CIS 150 reads the image data of the back side of the document conveyed by the document conveying mechanism 148 according to the lighting duty, the back side line scanning cycle, and the like set by the CPU 216.

In this case, the image data of the front side of the document read by the image reading unit 110 and the image data of the back side of the document read by the CIS 150 are not magnified. Accordingly, when the image data of the front side of the document is transferred from the image reading unit 110, the input image processing section 222 carries out the electronic magnification in the sub-scanning direction at the magnification ratio specified. Similarly, when the image data of the back side of the document is transferred from the CIS 150, the input image processing section 222 carries out the electronic magnification in the sub-scanning direction at the magnification ratio specified.

The image reading unit 110 finishes reading when the image data for the entire lines of the front side of the document is read, and the CIS 150 finishes reading when the image data for the entire lines of the back side of the document is read (Step S428).

The CPU 216 then finishes the control of the driving motor and thus, the document conveying mechanism 148 finishes conveying the document (Step S430).

By this way, because only the mechanical magnification is carried out in the single-side scanning mode, the productivity can be demonstrated to the fullest extent.

In the duplex scanning mode, when the reduction ratio is large (300 dpi to 400 dpi), the magnification is carried out by combining the mechanical magnification and the electronic magnification. For example, when magnifying at 350 dpi, the image data of the front side of the document is mechanically magnified from 600 dpi to 400 dpi and then electronically magnified to 350 dpi. The image data of the back side of the document is electronically magnified from 600 dpi to 350 dpi.

Consequently, compared with when the magnification of the image data of the front side of the document is carried out only by mechanical magnification, the lower limit of the back side line scanning cycle can be extended and the lighting duty of the LED 152 can also be extended. As a result, the luminance of the LED 152 can be reduced, whereby the occurrence of side effects such as an increase in cost and an increase in heat generated can be prevented. In other words, by combining the mechanical magnification and the electronic magnification, the side effects as described above can be prevented from occurring while maintaining the productivity.

Fourth Modification

The first to the third modifications described above can be combined appropriately. By combining the first modification and the third modification, it may be configured to select whether the productivity or the reusability is to be prioritized when carrying out the single-side scanning or the duplex scanning.

Second Embodiment

The first embodiment describes examples of controlling the light accumulation time by controlling the lighting of the LED. However, in a second embodiment, an example of controlling the light accumulation time using an electronic shutter function of the CIS will be explained. In the following, the difference from the first embodiment will mainly be explained and thus, the constituents having the same functions as those of the first embodiment are denoted and numbered the same as those of the first embodiment and their explanations are omitted.

Figure 9:
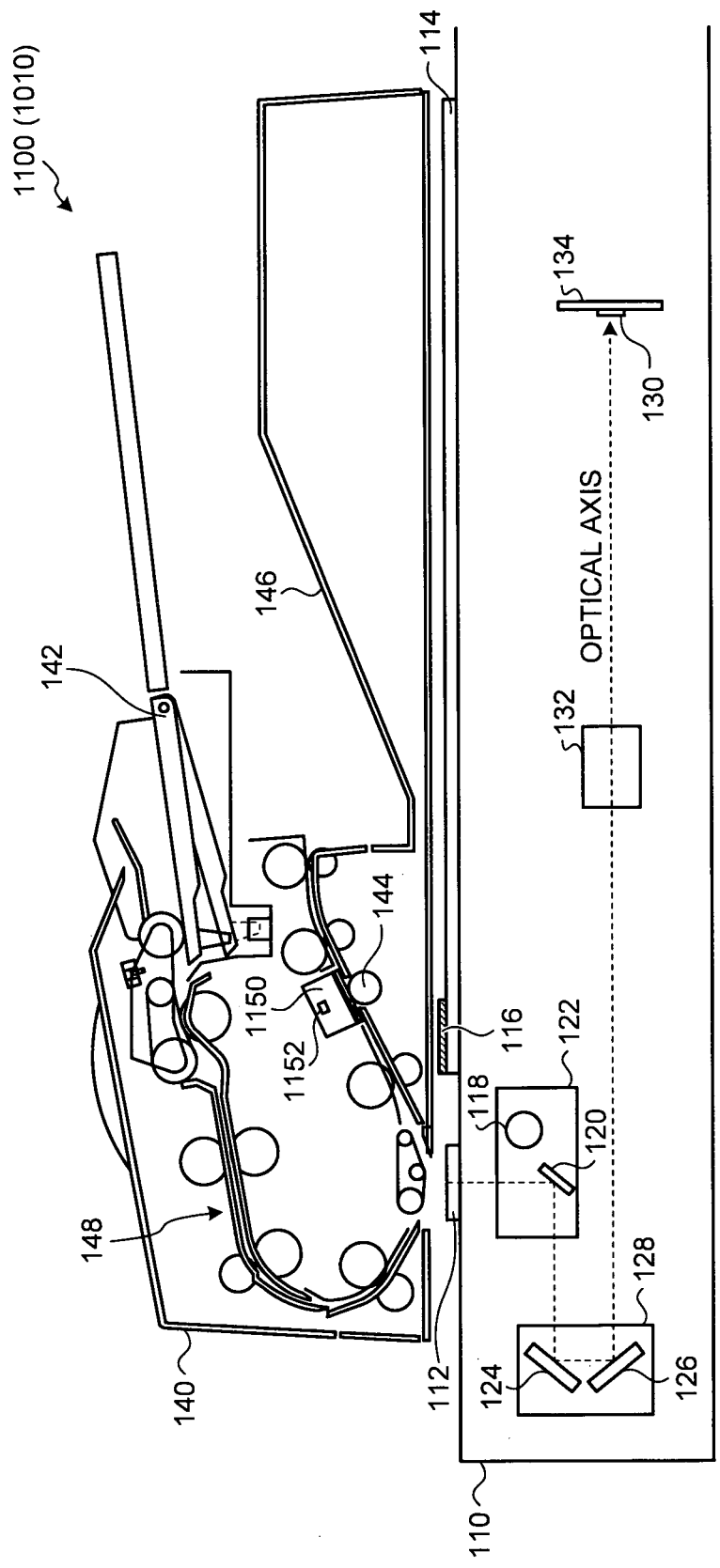
FIG. 9 is a schematic diagram illustrating an exemplary structure of a scanning device according to a second embodiment.
Figure 10:
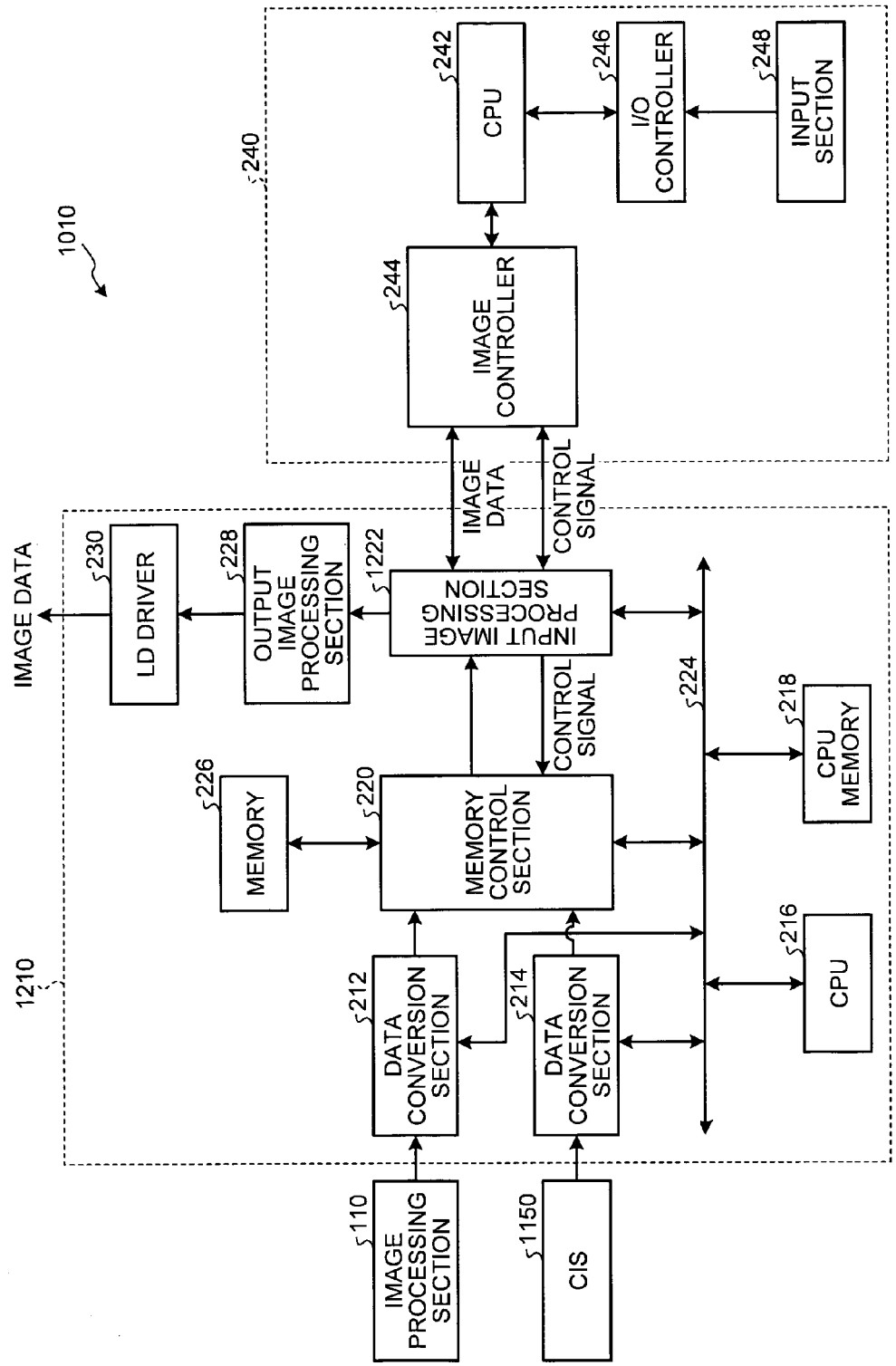
FIG. 10 is a block diagram illustrating an exemplary hardware structure of an MFP of the second embodiment.

FIG. 9 is a schematic diagram illustrating an exemplary structure of a scanning device 1100 (an exemplary image reader) provided to an MFP 1010 according to the second embodiment. FIG. 10 is a block diagram of an exemplary hardware structure of the MFP 1010 of the second embodiment. In the MFP 1010 of the second embodiment, a CIS 1150 and an input image processing section 1222 of an image processing section 1210 differ from the MFP 10 of the first embodiment.

The CIS 1150 is provided with a xenon lamp 1152 as a light source different from the CIS 150 of the first embodiment. With the xenon lamp 1152, in terms of responsiveness, it is difficult to control the lamp to be turned on and off within one line cycle. Therefore, in the CIS 1150 of the second embodiment, in place of controlling the lighting of the xenon lamp 1152, the light accumulation time is controlled to be less than or equal to the lower limit of the line scanning cycle by using an electronic shutter function. However, even when the LED is used as the light source, a similar control can be carried out using the electronic shutter function.

Figure 11:
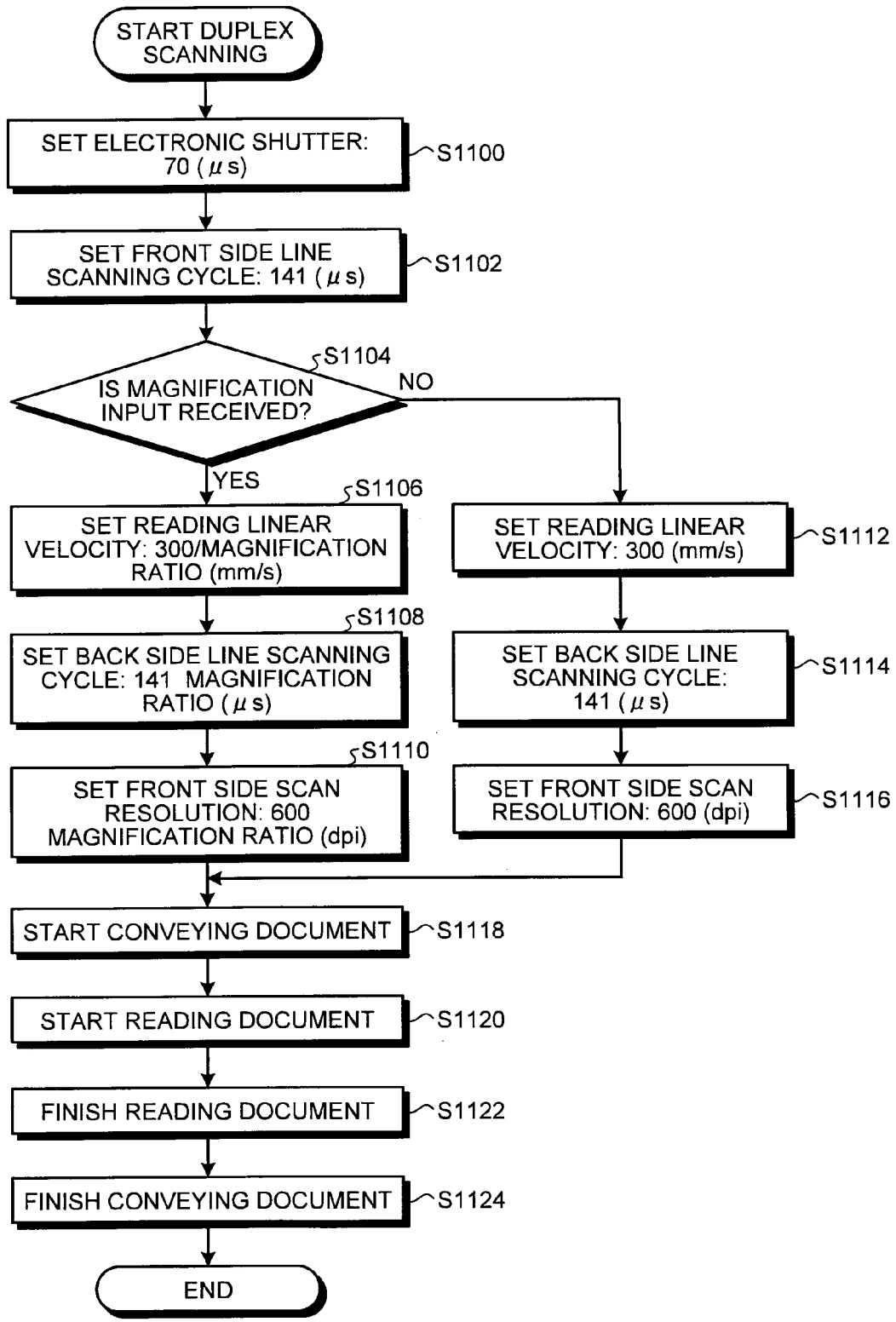
FIG. 11 is a flowchart illustrating an example of a duplex scanning process carried out by the MFP of the second embodiment.

FIG. 11 is a flowchart illustrating an exemplary procedure of the duplex scanning process carried out in the MFP 1010 of the second embodiment. The preconditions and the like are assumed to be the same as those of the flowchart depicted in FIG. 3.

When the CPU 216 receives the input of start reading from the input section 248 via the CPU 242, the CPU 216 sets an electronic shutter setting of the CIS 1150 to less than or equal to the lower limit of the back side line scanning cycle. In the example depicted in FIG. 11, because the lower limit of the back side line scanning cycle is 70.5 (141×1/2) microseconds, the CPU 216 sets the electronic shutter setting to 70 microseconds (Step S1100).

The subsequent processes carried out at Steps S1102 to S1118 are the same as those carried out at Steps S102 to S118, respectively, of the flowchart indicated in FIG. 3 and thus, their explanations are omitted.

At Step S1120, the image reading unit 110 reads the image data of the front side of the document conveyed by the document conveying mechanism 148 according to the front side line scanning cycle, the front side scan resolution, and the like set by the CPU 216. The CIS 1150 reads the image data of the back side of the document fed by the document conveying mechanism 148 according to the electronic shutter setting, the back side line scanning cycle, and the like set by the CPU 216.

Figure 12:
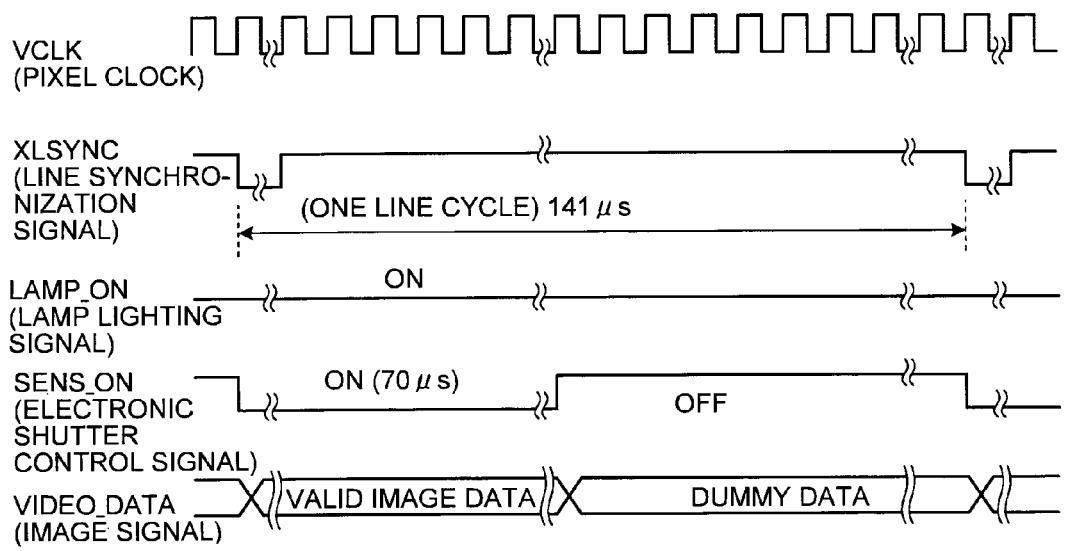
FIG. 12 is a timing chart illustrating exemplary signals communicated between the input image processing section and the CIS of the second embodiment when reading is performed at actual size magnification.

FIG. 12 is a timing chart illustrating exemplary signals communicated between the input image processing section 1222 and the CIS 1150 when the reading is performed at the actual size magnification.

In the example depicted in FIG. 12, every 141 microseconds that is the back side line scanning cycle, a line synchronization signal is generated by the CIS 1150 and is input to the input image processing section 1222. Synchronized with the line synchronization signal, the CIS 1150 starts to generate an electronic shutter control signal that indicates the release of an electronic shutter and, for a duration of 70 microseconds set by the electronic shutter setting, the electronic shutter control signal is kept input to the input image processing section 1222. Furthermore, the image signal is input from the CIS 1150 to the input image processing section 1222 within the back side line scanning cycle. The lamp lighting signal is input during the period of image reading.

In other words, in the example depicted in FIG. 12, the CIS 1150 starts to read the image data of one line on the back side of the document every 141 microseconds and releases the electronic shutter to store light for the period of 70 microseconds. The CIS 1150 then reads the image data of the one line on the back side of the document and outputs the data to the input image processing section 1222 within the period of 141 microseconds. The xenon lamp 1152 is lit during the period of image reading.

Figure 13:
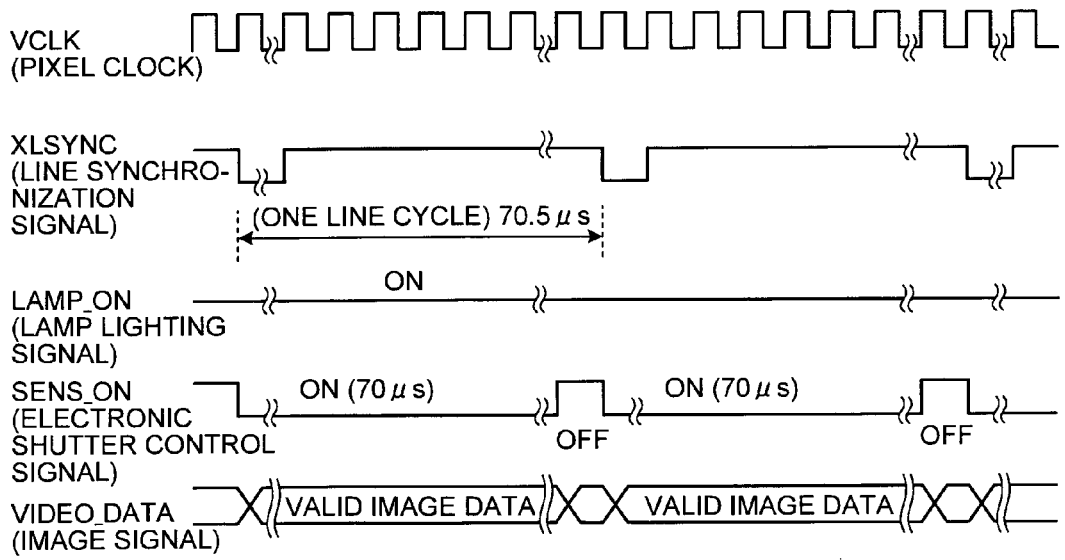
FIG. 13 is a timing chart illustrating the exemplary signals communicated between the input image processing section and the CIS of the second embodiment when reading is performed at the magnification ratio of one-half.

FIG. 13 is a timing chart illustrating the exemplary signals communicated between the input image processing section 1222 and the CIS 1150 when reading is performed at a magnification ratio of one-half.

In the example illustrated in FIG. 13, every 70.5 microseconds that is the back side line scanning cycle, a line synchronization signal is generated by the CIS 1150 and is input to the input image processing section 1222. Synchronized with the line synchronization signal, the CIS 1150 starts to generate an electronic shutter control signal indicating the release of the electronic shutter and, for the duration of 70 microseconds set by the electronic shutter setting, the electronic shutter control signal is kept input to the input image processing section 1222. The image signal is input from the CIS 1150 to the input image processing section 1222 within the back side line scanning cycle. The lamp lighting signal is input during the period of image reading.

In other words, in the example depicted in FIG. 13, the CIS 1150 starts to read the image data of one line on the back side of the document every 70.5 microseconds and releases the electronic shutter for the period of 70 microseconds to accumulate the light. The CIS 1150 then reads the image data of the one line on the back side of the document and outputs the data to the input image processing section 1222 within the period of 70.5 microseconds. The xenon lamp 1152 is lit during the period of image reading.

In the example depicted in FIG. 13, while the image data for one line of the front side of the document read by an image reading unit 1110 is mechanically magnified in the sub-scanning direction at 50% (300 dpi), the image data for one line of the back side of the document read by the CIS 1150 is not magnified. Therefore, when the image data of the back side of the document is transferred from the CIS 1150, the input image processing section 1222 electronically carries out the magnification in the sub-scanning direction at 50% (300 dpi).

The subsequent processes carried out at Steps S1122 to S1124 are the same as those carried out at Steps S122 to S124, respectively, of the flowchart indicated in FIG. 3 and thus, their explanations are omitted.

In the second embodiment, even when the resolution is fixed, the magnification is carried out electronically by making the reading linear velocity faster corresponding to the reduction ratio and by shortening the line scanning cycle corresponding to the reduction ratio. This allows the reading speed of the document to be prevented from slowing and productivity to be prevented from lowering, thereby maintaining the productivity similar to that of the mechanical magnification.

In the second embodiment, because the electronic shutter setting is controlled to be less than or equal to the lower limit of the line scanning cycle, the light accumulation time can be held constant even when the line scanning cycle is changed corresponding to the magnification ratio, whereby the fluctuation of the scanning characteristics and the deterioration of the image quality can be prevented. The xenon lamp 1152 is assumed be designed as an illumination system that has luminance required to satisfy the scanning performance (S/N) of the scanning device 1100.

Fifth Modification

In the second embodiment, modifications similar to the respective modifications explained in the description of the first embodiment can be carried out.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image reader comprising:
   a first image reading unit that reads first image data by scanning one surface of a document at a first resolution corresponding to a magnification ratio and a predetermined first scan cycle; and
   a second image reading unit that accumulates light radiated from a light source and reads second image data by scanning other surface of the document at a fixed second resolution and a second scan cycle corresponding to the magnification ratio,
   wherein the second image reading unit controls light accumulation time of the light radiated from the light source to be constant, when the second scan cycle is changed according to the magnification ratio,
   wherein the second image reading unit controls the light accumulation time to be less than or equal to a lower limit of the second scan cycle, and
   wherein the second image reading unit scans one line on the other surface of the document according to a line synchronization signal input thereto for each second scan cycle, and lights the light source according to a lighting signal started to be input in synchronization with the line synchronization signal and finished to be input at less than or equal to the lower limit.

2. The image reader according to claim 1, wherein the second image reading unit controls the light accumulation time to be less than or equal to the lower limit by controlling lighting of the light source.

3. The image reader according to claim 1, wherein the second image reading unit accumulates light radiated from the light source according to a control signal started to be input in synchronization with the line synchronization signal and finished to be input at less than or equal to the lower limit.

4. The image reader according to claim 1, further comprising a conveying unit that conveys the document at a conveying speed corresponding to the magnification ratio.

5. The image reader according to claim 1, further comprising a magnifying unit that electronically magnifies the second image data at the magnification ratio.

6. The image reader according to claim 5, wherein
the first image reading unit reads the first image data by scanning the one surface of the document at the first resolution corresponding to the magnification ratio and the first scan cycle in a first mode, and reads the first image data by scanning the one surface of the document at a predetermined first resolution and the first scan cycle in a second mode,
the second image reading unit reads the second image data by scanning the other surface of the document at the second resolution and the second scan cycle corresponding to the magnification ratio in the first mode, and reads the second image data by scanning the other surface of the document at the second resolution and a predetermined second scan cycle in the second mode, and
the magnifying unit further electronically magnifies the first image data read in the second mode at the magnification ratio.

7. The image reader according to claim 6, wherein the first mode is a productivity mode that prioritizes productivity and the second mode is a reusability mode that prioritizes reusability.

8. The image reader according to claim 6, wherein the first mode is a first application mode and the second mode is a second application mode.

9. The image reader according to claim 5, wherein
the first image reading unit reads the first image data by scanning the one surface of the document at the first resolution corresponding to the magnification ratio and the first scan cycle in a single-side scanning mode, and reads the first image data by scanning the one surface of the document at a predetermined first resolution and the first scan cycle in a duplex scanning mode,
the second image reading unit reads the second image data by scanning the other surface of the document at the second resolution and a predetermined second scan cycle in the duplex scanning mode, and
the magnifying unit further electronically magnifies the first image data read in the duplex scanning mode at the magnification ratio.

10. An image forming apparatus comprising an image reader which includes:
a first image reading unit that reads first image data by scanning one surface of a document at a first resolution corresponding to a magnification ratio and a predetermined first scan cycle; and
a second image reading unit that accumulates light radiated from a light source and reads second image data by scanning other surface of the document at a fixed second resolution and a second scan cycle corresponding to the magnification ratio,
wherein the second image reading unit controls light accumulation time of the light radiated from the light source to be constant, when the second scan cycle is changed according to the magnification ratio,
wherein the second image reading unit controls the light accumulation time to be less than or equal to a lower limit of the second scan cycle, and
wherein the second image reading unit scans one line on the other surface of the document according to a line synchronization signal input thereto for each second scan cycle, and lights the light source according to a lighting signal started to be input in synchronization with the line synchronization signal and finished to be input at less than or equal to the lower limit.

11. The image forming apparatus according to claim 10, further comprising a mode input unit for inputting a mode.

12. The image reader according to claim 1, wherein:
the first image reading unit uses a lens to change the magnification ratio.

13. The image reader according to claim 12, wherein:
the fixed second resolution cannot change.

14. The image reader according to claim 1, wherein:
the fixed second resolution cannot change.

15. The image reader according to claim 10, wherein:
the first image reading unit uses a lens to change the magnification ratio.

16. The image reader according to claim 15, wherein:
the fixed second resolution cannot change.

17. The image reader according to claim 10, wherein:
the fixed second resolution cannot change.

18. The image reader according to claim 10, wherein:
the device to form an image includes a photosensitive element.

* * * * *